(12) United States Patent
Harris et al.

(10) Patent No.: US 7,225,984 B2
(45) Date of Patent: Jun. 5, 2007

(54) SYSTEMS AND METHODS FOR PROVIDING MULTIPLE OBJECT PLANES IN AN OPTICAL IMAGE SCANNING ENVIRONMENT

(76) Inventors: Rodney C. Harris, 550 Linden View Dr., Fort Collins, CO (US) 80524; Kurt E. Spears, 319 Spinnaker La., Fort Collins, CO (US) 80525

( * ) Notice: Subject to any disclaimer, the term of this patent is extended or adjusted under 35 U.S.C. 154(b) by 0 days.

(21) Appl. No.: 10/369,490

(22) Filed: Feb. 20, 2003

(65) Prior Publication Data
US 2004/0164151 A1 Aug. 26, 2004

(51) Int. Cl.
G06K 7/10 (2006.01)
G06K 7/14 (2006.01)

(52) U.S. Cl. ...... 235/454; 355/128
(58) Field of Classification Search ...... 235/454, 235/455, 462.35; 358/474, 488, 475, 511; 359/618, 636, 638, 583, 362; 355/25, 82, 355/128
See application file for complete search history.

(56) References Cited

U.S. PATENT DOCUMENTS

| | | | | |
|---|---|---|---|---|
| 3,623,024 A | * | 11/1971 | Hamilton | 365/124 |
| 3,729,249 A | * | 4/1973 | Habegger et al. | 359/10 |
| 3,961,841 A | * | 6/1976 | Giordmaine | 359/264 |
| 3,982,835 A | * | 9/1976 | Schwomma | 356/458 |
| 4,059,756 A | | 11/1977 | Wilwerding | |
| 4,097,881 A | * | 6/1978 | Katagiri | 396/141 |
| 4,225,215 A | | 9/1980 | Cojan | |
| 4,413,905 A | * | 11/1983 | Holzapfel | 356/5.1 |
| 4,607,954 A | * | 8/1986 | Osaka et al. | 399/55 |
| 4,712,886 A | * | 12/1987 | Mercado | 359/796 |
| 4,872,775 A | * | 10/1989 | Chang | 401/52 |
| 4,901,297 A | * | 2/1990 | Komatsu et al. | 369/13.37 |
| 4,912,508 A | * | 3/1990 | Zawadzki et al. | 399/47 |
| 4,999,826 A | * | 3/1991 | Fujita | 369/44.41 |
| 5,028,963 A | * | 7/1991 | Ohashi et al. | 355/401 |
| 5,210,398 A | | 5/1993 | Metlitsky | |
| 5,278,677 A | | 1/1994 | Lee et al. | |

(Continued)

FOREIGN PATENT DOCUMENTS

EP 63222573 9/1988

(Continued)

OTHER PUBLICATIONS

R.W. Ditchburn, Light, Dover Publications, Inc. New York, pp. 67-68.*

(Continued)

Primary Examiner—Uyen-Chau N. Le

(57) ABSTRACT

Systems and methods for optically scanning multiple object planes are provided. One embodiment is a system for optically scanning multiple object planes comprising a platen and an optical head for scanning. The optical head comprises an optical delay element, a first optical sensor array positioned relative to a lens array along an optical path for receiving an optical signal corresponding to a first object plane located a first distance from the platen, and a second optical sensor array positioned relative to the lens array along another optical path for an optical signal corresponding to a second object plane located a second distance from the platen. The optical delay element is configured to increase the effective distance between the lens array and the second optical sensor.

13 Claims, 4 Drawing Sheets

U.S. PATENT DOCUMENTS

| | | | |
|---|---|---|---|
| 5,362,958 A | | 11/1994 | Ando |
| 5,402,210 A | * | 3/1995 | Hart et al. .................... 399/27 |
| 5,448,407 A | * | 9/1995 | Tzeng et al. ................ 359/638 |
| 5,450,157 A | | 9/1995 | Rees |
| 5,453,784 A | | 9/1995 | Krishnan et al. |
| 5,477,386 A | * | 12/1995 | Okuda et al. ................ 359/669 |
| 5,489,993 A | * | 2/1996 | Ito et al. ..................... 358/482 |
| 5,616,909 A | | 4/1997 | Arackellian |
| 5,726,775 A | * | 3/1998 | Walsh ........................ 358/488 |
| 5,736,738 A | | 4/1998 | Movaghar et al. |
| 5,742,326 A | | 4/1998 | Matsui et al. |
| 5,756,981 A | | 5/1998 | Roustaei et al. |
| 5,786,582 A | | 7/1998 | Roustaei et al. |
| 5,878,152 A | | 3/1999 | Sussman |
| 5,898,171 A | | 4/1999 | McConica et al. |
| 5,998,786 A | | 12/1999 | Movaghar et al. |
| 6,037,968 A | | 3/2000 | Emge et al. |
| 6,123,261 A | | 9/2000 | Roustaei |
| 6,124,952 A | | 9/2000 | Shieh et al. |
| 6,188,465 B1 | | 2/2001 | Rees et al. |
| 6,238,063 B1 | * | 5/2001 | Tanitsu et al. ............... 362/268 |
| 6,347,163 B2 | | 2/2002 | Roustaei |
| 6,348,982 B2 | * | 2/2002 | Iseki et al. .................. 358/475 |
| 6,385,352 B1 | | 5/2002 | Roustaei |
| 6,399,937 B1 | | 6/2002 | Huang et al. |
| 6,438,271 B1 | * | 8/2002 | Usami et al. ................ 382/274 |
| 6,449,065 B1 | * | 9/2002 | Luther et al. ................ 358/534 |
| 6,735,005 B2 | * | 5/2004 | Karin et al. ................. 359/212 |
| 2002/0100863 A1 | * | 8/2002 | Spears ..................... 250/208.1 |
| 2004/0094626 A1 | * | 5/2004 | Sillman et al. ......... 235/462.15 |

FOREIGN PATENT DOCUMENTS

| | | |
|---|---|---|
| EP | 0 570958 | 7/1997 |
| EP | 0946040 | 9/1999 |
| EP | 1003323 | 5/2000 |
| GB | 2 376 370 | 12/2002 |
| JP | 61045419 A * | 3/1986 |
| JP | 11341219 | 12/1999 |

OTHER PUBLICATIONS

Optical Path Length, http://en.wikipedia.org, p. 1.*
Optical Properties, http://mellesgriot.com, pp. 4.4-4.15.*
Frank L. Pedrotti, and Leno S. Pedrotti, Introduction to Optics, Prentic Hall, Second Edition, pp. 40-43.*
UK Search Report dated Jun. 29, 2004, 3 pgs.
UK Searc Report dated Nov. 19, 2004 (2 pages).

* cited by examiner

SYSTEMS AND METHODS FOR PROVIDING MULTIPLE OBJECT PLANES IN AN OPTICAL IMAGE SCANNING ENVIRONMENT

BACKGROUND

Optical image scanners, also known as document scanners, convert a visible image (e.g., on a document or photograph, an image in a transparent medium, etc.) into an electronic form suitable for copying, storing, or processing by a computer. An optical image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices (e.g., a charge-coupled device, complimentary metal-oxide semiconductor (CMOS), etc.). Transparency image scanners pass light through a transparent image, for example a photographic positive slide, through optics, and then onto an array of photosensitive devices. The optics focus at least one line, called a scanline, of the image being scanned, onto the array of photosensitive devices. The photosensitive devices convert received light intensity into an electronic signal. An analog-to-digital converter converts the electronic signal into computer readable binary numbers, with each binary member representing an intensity value.

There are two common types of image scanners. In a first type, a single spherical reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays (SLA) (available from Nippon Sheet Glass Co.), in which an array of rod-shaped lenses is used, typically with multiple photosensors receiving light through each individual lens.

Depth of focus refers to the maximum distance that the object position may be changed while maintaining a certain image resolution (i.e., the amount by which an object plane may be shifted along the optical path with respect to some reference plane and introduce no more than a specified acceptable blur). The depth of focus for lens arrays is typically relatively short in comparison to scanners using a single spherical reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.7–1.5 mm above the surface of the platen. As a result, slides may be slightly out of focus when using lens arrays that are focused at the surface of the platen. Another example is scanning books or magazines where part of a page being scanned curves into a binding spline, causing part of the surface being scanned to be positioned above the transparent platen. A large depth of focus is needed to sharply image the binding spline.

SUMMARY

Embodiments of the present invention provide systems and methods for optically scanning multiple object planes. One embodiment is a system for optically scanning multiple object planes comprising a platen and an optical head for scanning. The optical head comprises an optical delay element, a first optical sensor array positioned relative to a lens array along an optical path for receiving an optical signal corresponding to a first object plane located a first distance from the platen, and a second optical sensor array positioned relative to the lens array along another optical path for receiving an optical signal corresponding to a second object plane located a second distance from the platen. The optical delay element is configured to increase the effective distance between the lens array and the second optical sensor.

Another embodiment comprises an optical head for scanning. The optical head comprises a beam splitter positioned relative to a lens array and configured to reflect a first optical signal and transmit a second optical signal. The optical head further comprises a first optical sensor array positioned to receive the first optical signal corresponding to a first object plane located a first distance from the platen and a second optical sensor array to receive the second optical signal corresponding to a second object plane located a second distance from the platen.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
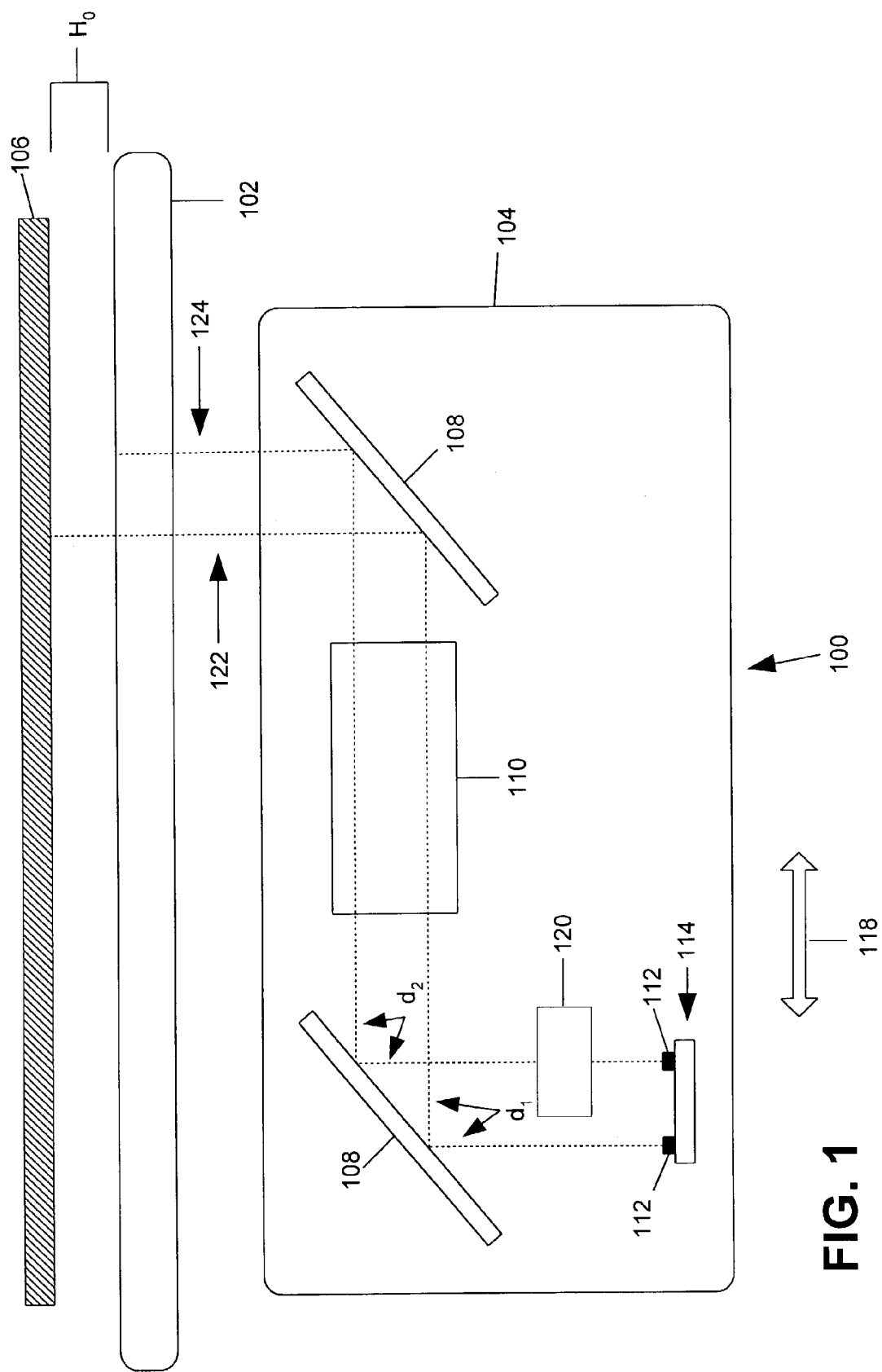
FIG. 1 is a block diagram of a cross-sectional view of an embodiment of an optical image scanner according to the present invention for providing multiple object planes to be scanned.

FIG. 1 is a block diagram of a cross-sectional view of an optical image scanner 100 according to the present invention for providing multiple object planes to be scanned. Various exemplary embodiments are described in detail below. However, by way of introduction, optical image scanner 100 provides a means for scanning at multiple (at least two) object planes located above platen 102, without having to reposition optical head 104 relative to platen 102. Instead of moving optical head 104, various embodiments of optical image scanner 100 provide multiple object planes to be scanned by modifying the internal optics of optical head 104. In this regard, optical head 104 may remain fixed relative to platen 102, while the internal optics are configured to provide multiple object planes (i.e., a primary focal point at various distances above the top surface of platen 102). It should be appreciated, however, that in some embodiments of optical image scanner 100, optical head 104 may also be repositioned to provide further flexibility in shifting object planes.

The relative sizes of various objects in FIG. 1 are exaggerated to facilitate illustration. As shown in FIG. 1, optical image scanner 100 comprises an optical head 104 (also known as a carriage) positioned relative to a transparent platen 102. As known in the art, a document 106 may be placed on the top surface of the platen 102 for scanning. Optical image scanner 100 may be included within an optical image scanner (e.g., a low profile flatbed scanner), a facsimile machine, copier, etc.

As further illustrated in FIG. 1, optical head 104 comprises a first reflective surface 108 (e.g., mirror, etc.), a lens array 110, a second reflective surface 108, and an image sensor module 114. Image sensor module 114 may comprise, for example, a printed circuit assembly or any other semiconductor device. Image sensor module 114 also includes at least two photosensor arrays 112, which may be any type of device configured to receive optical signals and convert the light intensity into an electronic signal. For example, as known in the art, photosensor array 112 may comprise a charge-coupled device (CCD), complimentary metal-oxide semiconductor (CMOS), etc. As illustrated in FIG. 1, image sensor module 114 is positioned in a parallel relationship to platen 102. Photosensor arrays 112 are disposed on the surface of image sensor module 114 so that one photosensor array 112 receives a first optical signal (along optical path 122) corresponding to a first object plane located a first distance from platen 102 (e.g., a distance $H_0$ away from the top surface of platen 102) and a second photosensor array 112 receives a second optical signal (along optical path 124) corresponding to a second object plane located a second distance from platen 102 (e.g., near the top surface of platen 102).

Lens array 110 may comprise an array of rod-shaped lenses which have a relatively short depth of focus. For example, lens array 110 may comprise a Selfoc® lens array (SLA), which is manufactured and sold by Nippon Sheet Glass Co. of Somerset, N.J. A rod-lens array may comprise at least one row of graded-index micro lenses, which may be equal in dimensions and optical properties. The lenses may be aligned between two fiberglass-reinforced plastic (FRP) plates. Because FRP has a coefficient of thermal expansion equal to glass, thermal distortion and stress effects is minimal. The FRP also increases mechanical strength of the SLA. The interstices may be filled with black silicone to prevent flare (crosstalk) between the lenses and protect each individual lens.

Referring again to FIG. 1, as a document 106 is being scanned by optical head 104, an optical signal(s) (e.g., light) is reflected off the document 106 and towards the first reflective surface 108 (along optical paths 122 and 124). The first reflective surface 108 directs the optical signals through the lens array 110 to be focused. The optical signals may also be reflected toward image sensor module 114 by a second reflective surface 108. The optical signal(s) along optical paths 122 and 124 is received by corresponding photosensor arrays 112 and converted into an electronic signal, which may be processed by an analog-to-digital converter, digital signal processor, etc. In this manner, the optics within optical head 104 focus a portion of an image on document 106 onto photosensor arrays 112.

It should be appreciated that optical image scanner 100 may be configured in a variety of other ways. For example, the second reflective surface 108 may be optional. For instance, in order to alter the cross-sectional profile of optical head 104, second reflective surface 108 may be removed and the image sensor module 114 may be oriented perpendicular to the optical axis of lens array 110. Alternatively, the optical axis of lens array 110 may be oriented perpendicular to platen 102 to direct light through lens array 100 and onto photosensor arrays 112. The particular orientation of lens array 110 is not relevant to the present invention.

The optical components within optical head 104 focus at least one line (i.e., a scanline) of the image being scanned onto photosensor array 112. As known in the art, scanning of the entire image may be accomplished by translating optical head 104 relative to document 106 (e.g., by using cables) as indicated by reference number 118.

As mentioned above, due to the relatively small depth of focus of lens array 110, existing optical image scanners may produce blurred images of documents 106 that are positioned a small distance above/below the primary focal point of lens array 10. For example, existing optical image scanners may be configured with the primary focal point at a relatively short distance $H_0$ above the top surface of platen 102. When a document 106, such as a sheet of paper, etc. is positioned on platen 102, it may be located approximately the distance $H_0$ above the top surface of platen 102 or within the relatively small range of the depth of focus. However, if the document 106 is positioned at an object plane that is outside of a range of acceptable focus, existing optical image scanners may produce a blurred image. For instance, various types of documents (or portions of the document) may be located at an object plane outside of the range of acceptable focus when positioned on platen 102 (e.g., 35 mm slides, transparencies, photographs, books, magazines, etc.).

In this regard, the present invention provides a means for scanning an image at multiple object planes without having to reposition optical head 104 relative to platen 102. In general, optical image scanner 100 provides multiple object planes relative to platen 102 by changing the effective distance of one optical path (between lens array 110 and photosensor array 112) relative to the other optical path. For instance, referring to FIG. 1, the actual distance (along the optical paths 122 and 124) between lens array 110 and each photosensor array 112 is approximately equal (i.e., $d_1=d_2$). As known in the art, where the reflective surface 108 is disposed at an angle of 45 degrees relative to the optical axis of lens array 110, these distances will be equal. Optical image scanner 100 generates multiple object planes by providing one optical path (e.g., optical path 124 in FIG. 1) with a longer effective distance (i.e., a longer optical distance). It should be appreciated that the relative difference in effective optical distance between lens array 110 and photosensor array 112 translates into an equal difference in corresponding object planes (i.e., the primary focal point above platen 102).

The relative difference in effective optical distance between lens array 110 and photosensor arrays 112 may be accomplished in a variety of ways. (e.g., filter, prism, etc.). As illustrated in FIG. 1, in one of many possible embodiments, optical head 104 further comprises an optical delay element 120 positioned relative to one of the optical sensor arrays 112 along the corresponding optical path 124. Optical delay element 120 is configured to increase the effective optical distance along optical path 124 between lens array 110 and optical sensor array 112. In other words, optical delay element 120 is configured to slow down light that travels through the element towards optical sensor array 112. In this regard, optical delay element 120 comprises a medium that has a larger optical density than the surrounding medium. Optical delay element 120 may comprise any optical medium (e.g., crown glass, flint glass, silicates, dielectrics, etc.) which has a higher index of refraction than the surrounding medium.

As known in the art, the index of refraction of a medium is defined as the ratio of the velocity of light in a vacuum to the velocity of light in the medium (Equation 1). A ray of light travels more slowly in an optically dense medium than in one that is less dense, and the index of refraction (n) gives a measure of this effect.

$$n_{medium} = \frac{c \text{ (velocity of light in vacuum)}}{v_{medium} \text{ (velocity of light in medium)}}$$

Equation 1: Index of Refraction

Figure 2:
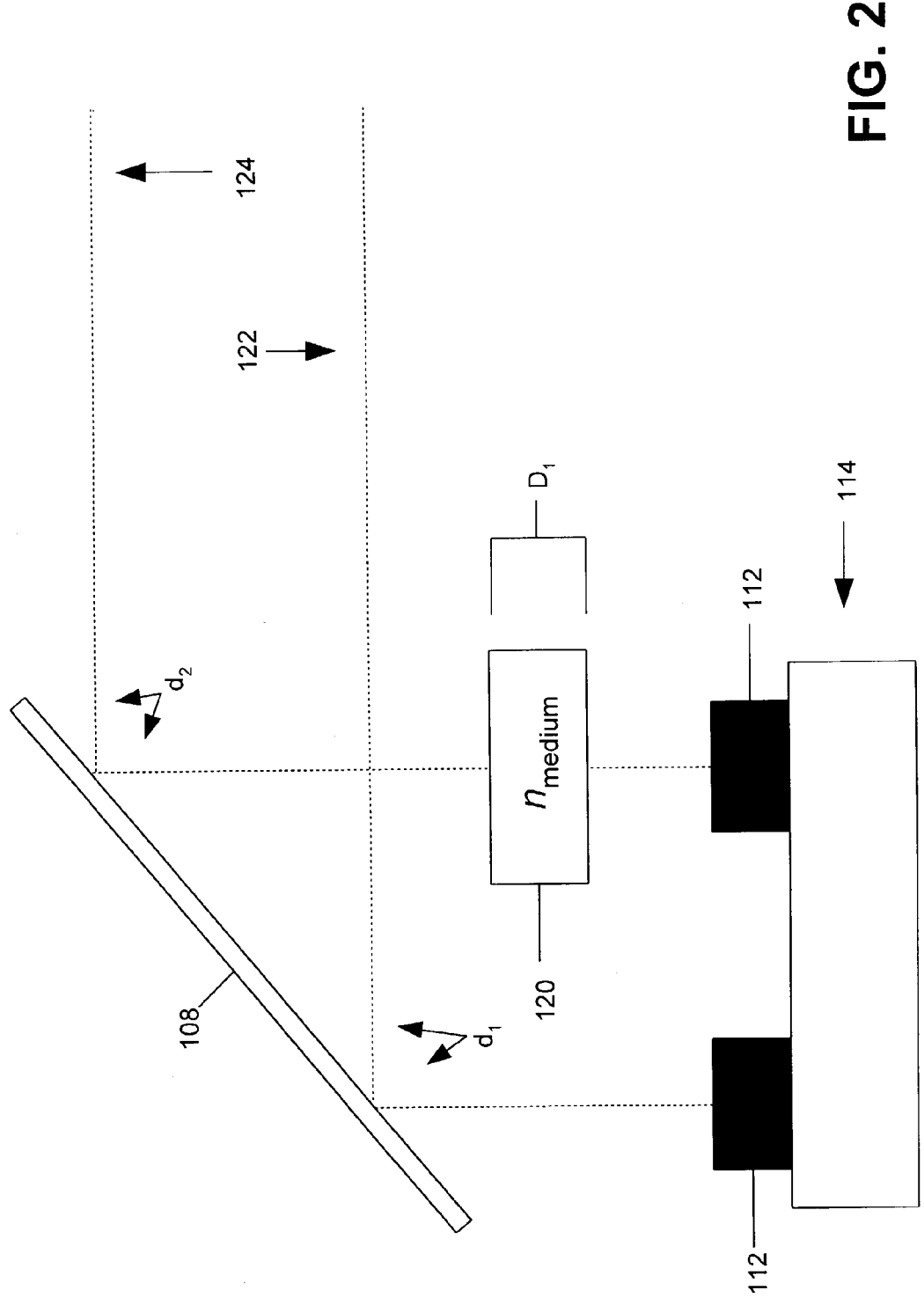
FIG. 2 is a more detailed diagram illustrating the optical delay element of FIG. 1.

Referring to FIG. 2, light travelling along optical path 406 between lens array 122 and a photosensor array 112 travels a distance, $d_1$. As stated above, $d_1=d_2$ where reflective surface 108 is disposed at an angle of 45 degrees. However, when optical delay element 120 is positioned along optical path 124, light travelling along this path will effectively travel a longer optical distance because of the effects of the higher index of refraction. In other words, the object plane corresponding to optical path 124 is shifted below photosensor array 112. Accordingly, it should be appreciated that the photosensor array 112 is effectively shifted closer to lens array 110, which shifts the primary focal point closer to the top surface of the platen 102 to a new object plane.

The difference in effective optical path lengths (between $d_2$ and $d_1$) may be calculated according to Equation 2.

$$d_2 - d_1 = \frac{(D_1)(n_{medium} - 1)}{n_{medium}}$$

Equation 2: Difference in Effective Optical Path Lengths

The relative difference in effective optical distance for optical path lengths $d_1$ and $d_2$ may be calculated as the difference between the effective distance and the actual thickness of delay optical element 120 along optical path 124. As stated above, the relative difference in effective optical distance translates into a proportional difference in corresponding object planes (i.e., the primary focal point above platen 102). Thus, by positioning optical delay element 120 along optical path 124, the corresponding object plane maybe shifted relative to platen 102 equal to the difference between the thickness of optical delay element 410 and the effective optical distance of optical delay element 120.

Referring again to FIG. 1, during the scan process, a controlled source of light may be reflected off the surface of document 106, into optical head 104 through an aperture, and onto image sensor module 114. It should be appreciated that the relative difference in effective optical distance for optical paths $d_1$ and $d_2$ enables the multiple object planes to be focused, detected, and converted into electronic signals, etc. By way of example, as a document 106 is being scanned, optical image scanner may simultaneously scan each object plane and determine which object plane generates a better image. For example, if object 106 is a book, magazine, etc. where part of a page to be scanned curves into a binding spline, optical image scanner 100 may simultaneously scan each object plane and determine which object plane generates a more focused image. Therefore, as optical head 104 is translated relative to platen 102, images with improved focus may be generated as the object plane shifts along the curved spline.

Figure 3:
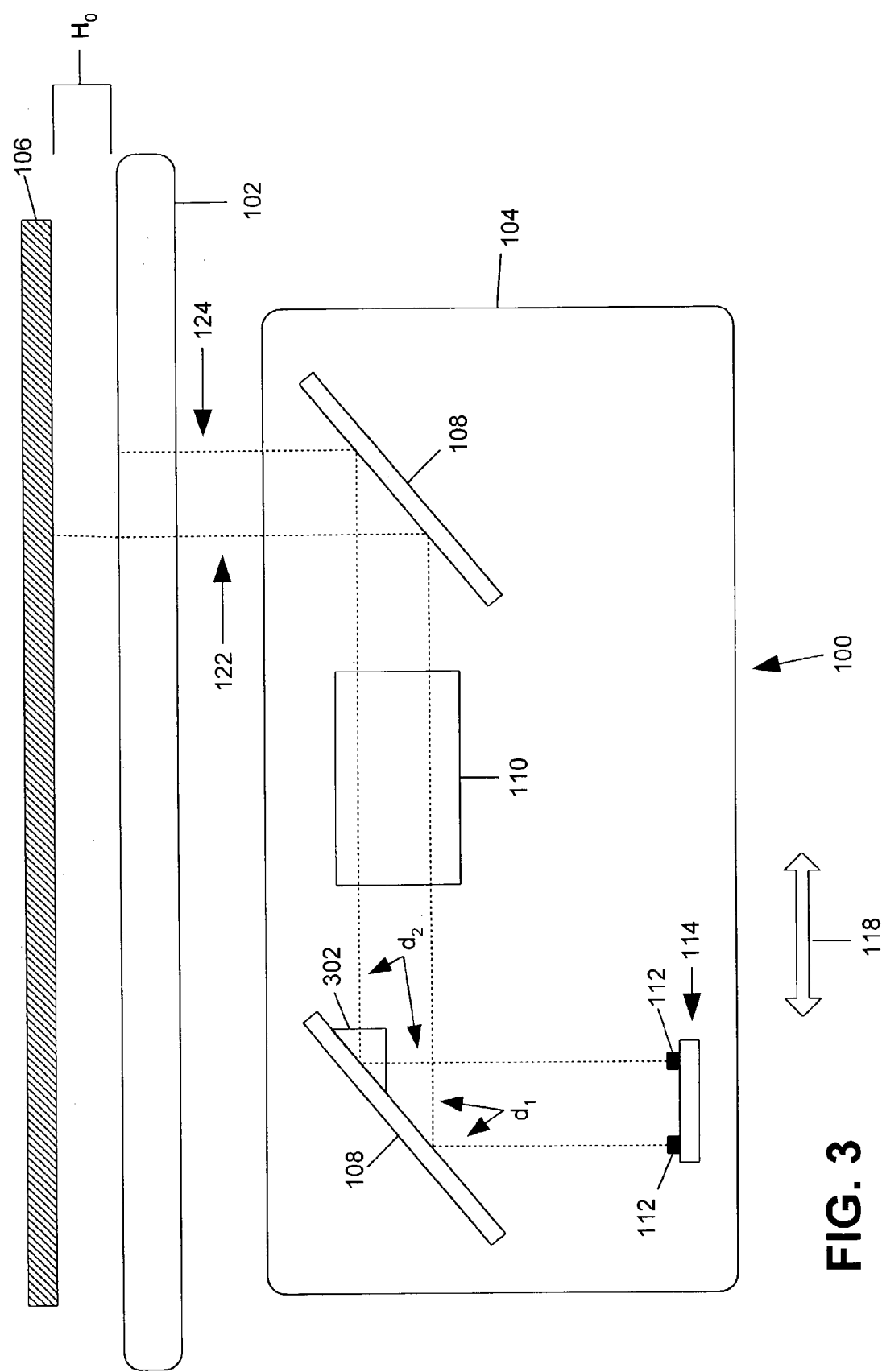
FIG. 3 is a cross-sectional view of another embodiment of an optical image scanner according to the present invention for providing multiple object planes to be scanned.

There a number of alternative ways for generating multiple object planes by creating the relative difference in effective optical distances along optical paths 122 and 124. FIG. 3 is a cross-sectional view of another embodiment of optical image scanner 100 according to the present invention for providing multiple object planes. Optical image scanner 100 may be configured in much the same manner as in FIG. 1. However, as illustrated in FIG. 3, the second reflective surface 108 may be configured with a prism 302. The combination mirror/prism may be disposed relative to lens array 110 so that light travelling along optical path 122 is reflected toward one of the photosensor arrays 112 without travelling through prism 302. Light travelling along optical path 124, however, passes through prism 302. As illustrated in FIG. 3, light may enter prism 302 at a first edge and propagate toward reflective surface 108, where the light is then reflected and passed out a second edge of prism 302 toward the other photosensor array 112 along optical path 124. As described above, the effect of prism 302 is that the length of optical path 124 from lens array 110 to photosensor array 112 (i.e., $d_2$) is effectively longer due to the higher index of refraction of the prism 302. Thus, prism 302 may comprise any optical medium (e.g., crown glass, flint glass, silicates, dielectrics, etc.) which has a higher index of refraction than the surrounding medium through which light travelling along optical path 122 travels. It should be appreciated that, due to prism 302, the object plane corresponding to optical path 124 may be shifted relative to platen 102 in proportion to the difference between the actual distance light travels in prism 302 and the effective optical distance defined by the index of refraction of prism 302.

It should be appreciated that the first reflective surface 108 may also, or instead, be configured with a prism 302. However, in order to maintain the relative difference in effective optical distances along optical paths 122 and 124, the optical properties and/or the dimensions of the respective prisms 302 would be different.

Figure 4:
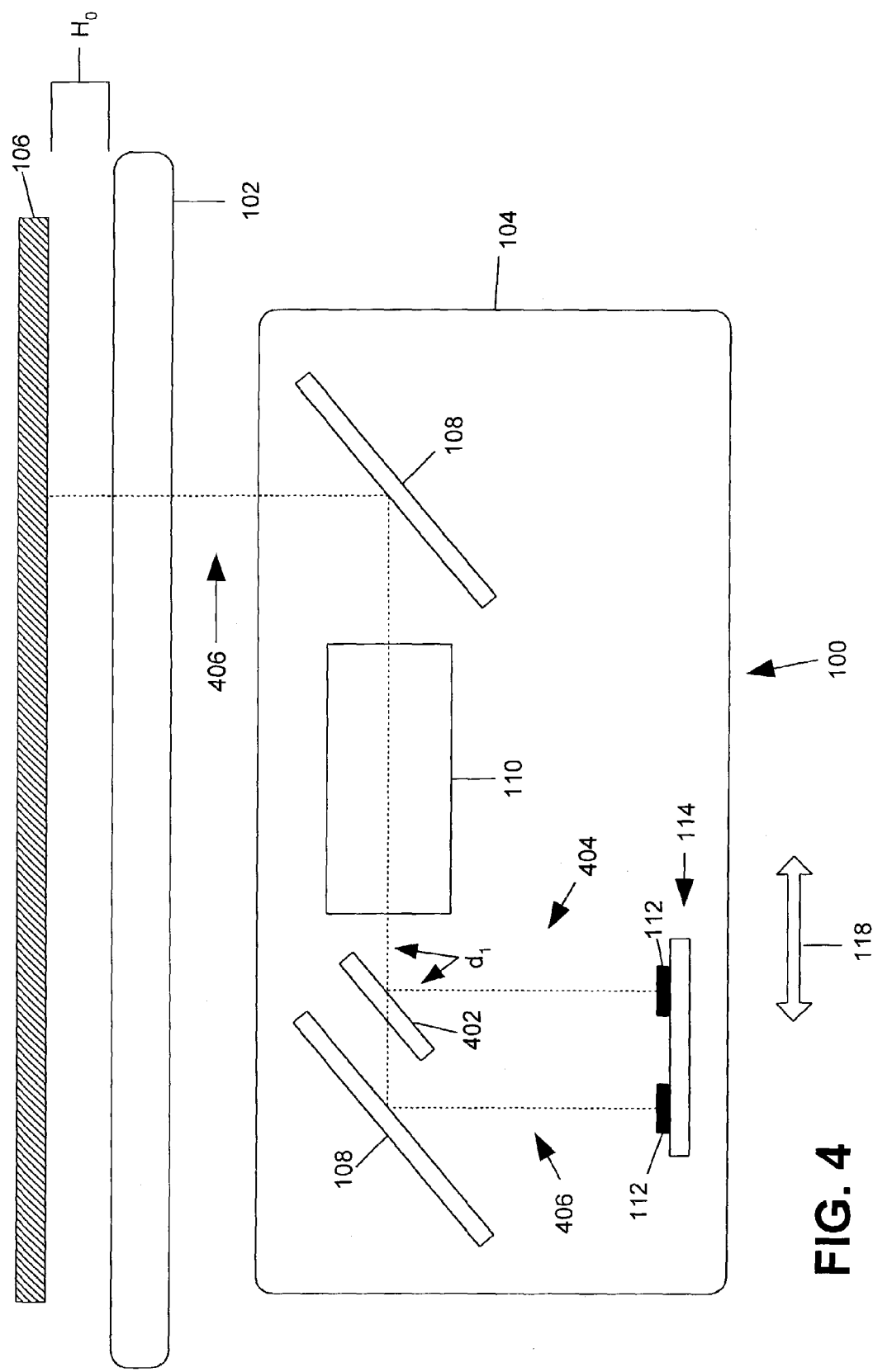
FIG. 4 is a cross-sectional view of a further embodiment of an optical image scanner according to the present invention for providing multiple object planes to be scanned.

FIG. 4 is a cross-sectional view of a further embodiment of an optical image scanner according to the present invention for providing multiple object planes. Optical image scanner 100 may be configured in much the same manner as in FIG. 1. However, as illustrated in FIG. 4, in the embodiment illustrated in FIG. 4, optical image scanner 100 further comprises a beam splitter 402 positioned relative to lens array 110 along the optical axis. The beam splitter 402 is configured to receive light travelling along the optical axis from lens array 110. The beam splitter 402 reflects a portion of the light along optical path 404 toward one photosensor array 112 and transmits another portion of the light toward another photosensor array 112 along optical path 406. By splitting the optical axis of lens array 110 into two different optical paths 404 and 406, a relative difference in optical lengths (between lens array 110 and photosensor arrays 112) may be generated. Again, this relative difference translates into a proportional difference in corresponding object planes (i.e., the primary focal point above platen 102).

In the embodiment illustrated in FIG. 4, the beam splitting mechanism 402 may comprise a partially-silvered reflective surface configured to reflect a portion of light and transmit another portion of light along the respective optical paths 404 and 406. As illustrated in FIG. 4, the optical path 406 for the transmitted light may then be lengthened relative to the optical path 404. For example, the second reflective surface 108 (e.g., a full-silvered mirror) may be located a distance $H_O$ from partially-silvered reflective surface 402. The distance $H_O$ may be matched to the lateral distance between the two photosensor arrays 112. Thus, the second reflective surface 108 may then reflect the transmitted light along optical path 406 toward the corresponding photosensor array 112. In this manner, the total distance between lens array 110 and photosensor arrays 112 is lengthed (by the distance $H_O$) for optical path 406. This relative difference translates into an equal difference in corresponding object planes (i.e., the primary focal point above platen 102).

It should be appreciated that alternative beam splitting mechanisms may be employed. For example, partially-silvered reflective surface 402 and second reflective surface 108 may be combined as a beam splitting prism. In this configuration, the relative difference between the two optical paths would still be proportional to the additional distance that the transmitted light travels relative to the reflected light. One of ordinary skill in the art will appreciate that a number of alternative configurations may achieve the beam splitting function. For instance, where partially-silvered reflective surface 402 is used to split the optical axis of lens array 110, a second reflective surface need not be employed. Instead, the corresponding photosensor array 112 may be located to receive the transmitted light without reflecting it toward image sensor module 114. Rather, two image sensor modules 114 may be employed.

Therefore, having thus described the invention, at least the following is claimed:

1. A system for optical image scanning, the system comprising:
    a platen;
    an optical head for scanning, the optical head comprising:
        a first optical sensor array positioned relative to a lens array along a first optical path for receiving an optical signal corresponding to a first object plane located a first distance from the platen;
        a second optical sensor array positioned relative to the lens array along a second optical path for receiving an optical signal corresponding to a second object plane located a second distance from the platen; and
        an optical delay element disposed along the second optical path and configured to increase the effective optical distance between the lens array and the second optical sensor relative to the optical distance between the lens array and the first optical sensor.

2. The system of claim 1, wherein the optical head further comprises a lens array positioned relative to the platen for focusing at least the first and second optical paths.

3. The system of claim 1, wherein the optical delay element comprises an optically clear window having an index of refraction greater than that of air.

4. The system of claim 1, wherein the optical delay element comprises glass.

5. The system of claim 1, wherein the optical delay element comprises a filter integrated with an image sensor module.

6. The system of claim 1, wherein the optical delay element comprises a prism.

7. The system of claim 1, wherein the optical head further comprises a reflective surface positioned relative to the lens array to reflect at least the first and second optical paths to the corresponding optical sensor array.

8. The system of claim 7, wherein the optical delay element is disposed on the reflective surface.

9. A system for optical image scanning, comprising:
    an image sensor module adapted to receive an optical signal via first and second optical paths, the first and second optical paths corresponding to respective first and second object planes; and
    an optical delay element adapted to increase an effective optical distance of the first optical path to locate the first object plane a predetermined distance from the second object plane.

10. The system of claim 9, wherein the optical delay element is disposed between the image sensor module and a lens array.

11. The system of claim 9, further comprising a lens array disposed along the first and second optical paths.

12. The system of claim 9, wherein the optical delay element comprises a prism.

13. The system of claim 9, wherein the optical delay element is disposed along the first optical path.

* * * * *